US010889321B2

(12) United States Patent
Arnold

(10) Patent No.: US 10,889,321 B2
(45) Date of Patent: Jan. 12, 2021

(54) STEERING MODULE FOR A VEHICLE AND STEERING SYSTEM

(71) Applicant: SCHAEFFLER PARAVAN TECHNOLOGIE GMBH & CO. KG, Herzogenaurach (DE)

(72) Inventor: Roland Arnold, Pfronstetten-Aichelau (DE)

(73) Assignee: Schaeffler Paravan Technologie GmbH & Co. KG, Herzogenaurach (DE)

( * ) Notice: Subject to any disclaimer, the term of this patent is extended or adjusted under 35 U.S.C. 154(b) by 319 days.

(21) Appl. No.: 15/941,172

(22) Filed: Mar. 30, 2018

(65) Prior Publication Data

US 2018/0312193 A1 Nov. 1, 2018

(30) Foreign Application Priority Data

Apr. 27, 2017 (DE) ........................ 10 2017 109 081

(51) Int. Cl.

*B62D 6/00* (2006.01)
*B62D 1/02* (2006.01)
*B62D 5/04* (2006.01)
*B62D 5/00* (2006.01)
*B62D 1/22* (2006.01)

(52) U.S. Cl.

CPC ............... *B62D 6/008* (2013.01); *B62D 1/02* (2013.01); *B62D 1/22* (2013.01); *B62D 5/003* (2013.01); *B62D 5/006* (2013.01); *B62D 5/0466* (2013.01)

(58) Field of Classification Search

CPC ........ B62D 6/008; B62D 5/006; B62D 5/003; B62D 1/22; B62D 5/0466

See application file for complete search history.

(56) References Cited

U.S. PATENT DOCUMENTS 6,059,068 A * 5/2000 Kato ...................... B62D 5/006 180/402
6,612,393 B2 * 9/2003 Bohner .................. B62D 5/003 180/402
7,322,439 B2 * 1/2008 Hara ...................... B62D 1/163 180/402
7,651,124 B2 1/2010 Gulde
7,970,514 B2 6/2011 Aeberhardt et al.

(Continued)

FOREIGN PATENT DOCUMENTS

DE 19902557 7/2000
DE 19912169 7/2000

(Continued)

OTHER PUBLICATIONS

European Search Report dated Sep. 14, 2018 (with English translation).

*Primary Examiner* — Ruth Ilan
*Assistant Examiner* — Harold Eric Pahlck, III
(74) *Attorney, Agent, or Firm* — Collard & Roe, P.C.

(57) ABSTRACT

A steering module for a vehicle has a steering input element and a sensor device, which includes at least one sensor, for registering the position of the steering input element, and has a servomechanism which includes a first actuator and acts on the steering input element. The servomechanism is redundantly designed and comprises a second actuator.

16 Claims, 1 Drawing Sheet

(56) References Cited

U.S. PATENT DOCUMENTS

| | | | | |
|---|---|---|---|---|
| 8,589,029 | B2 * | 11/2013 | Egenfeldt | B62D 5/0481 701/42 |
| 8,725,356 | B2 * | 5/2014 | Ishihara | B62D 5/006 701/42 |
| 9,038,761 | B2 * | 5/2015 | Alton | B62D 1/22 180/322 |
| 10,112,639 | B2 * | 10/2018 | Schulz | B62D 1/183 |
| 10,343,715 | B2 * | 7/2019 | Sakata | B62D 6/008 |

FOREIGN PATENT DOCUMENTS

| | | | |
|---|---|---|---|
| DE | 10200826 | | 5/2003 |
| DE | 10329292 | | 1/2005 |
| DE | 10333281 | | 2/2005 |
| DE | 102009043606 | A1 | 4/2011 |
| EP | 1607303 | | 12/2005 |
| EP | 2214945 | | 8/2010 |
| WO | 0212052 | | 2/2002 |
| WO | 2005102815 | | 11/2005 |
| WO | 2011032586 | | 3/2011 |

* cited by examiner

STEERING MODULE FOR A VEHICLE AND STEERING SYSTEM

CROSS-REFERENCE TO RELATED APPLICATIONS

This application claims priority under 35 USC 119 of German Application No. 10 2017109 081.9, filed on Apr. 27, 2017, the disclosure of which is herein incorporated by reference.

BACKGROUND OF THE INVENTION

The invention relates to a steering module for a vehicle comprising a steering input element and a sensor device, which includes at least one sensor, for registering the position of the steering input element, and comprising a servomechanism which includes a first actuator and acts on the steering input element.

So-called steer-by-wire systems are also known for motor vehicles, in the case of which the steering wheel simply generates the setpoint signal for the steering actuation by means of a sensor on the steering wheel. Thus, there is no mechanical connection of the steering wheel to a steering gear. A steering column can frequently be dispensed with. Due to the elimination of a steering column which is rigidly connected to the steered front axle, the road feel, which is imparted to the driver during conventional steering by way of the restoring torque, i.e., a manual torque on the steering wheel, is lost.

DE 199 12 169 A1 describes a so-called force-feedback unit, with the aid of which this road feel is to be restored. The level of the torque to be applied counter to the rotary motion of the steering wheel, as the steering resistance, is controlled by a control unit, in which the required voltage values for the controller are ascertained on the basis of appropriately registered influencing variables.

EP 2 214 945 B1 describes a handicap-accessible vehicle comprising a controller. The vehicle comprises a steering input module including a mechanical interface, onto which various exchangeable control elements for steering the vehicle can be installed. The steering input module comprises a sensor in order to register the motion of the control element, wherein, moreover, at least one steering actuator is provided for carrying out the steering intention on the vehicle, the steering input module being connected to the steering actuator. There is at least one main controller board for each steering input module, in order to carry out the adjustments of the individual parameters related to steering angle and straight-ahead position with respect to a certain one of the exchangeable control elements for steering the vehicle.

One disadvantage of the known steering systems is that lawmakers still do not consider these steering systems to be sufficiently reliable in order to permit driving exclusively via “steer-by-wire”.

SUMMARY OF THE INVENTION

The problem addressed by the present invention is therefore that of providing a steering module and a steering system, by means of which the appropriate safety requirements are met.

This problem is solved according to the invention by a steering module for a vehicle comprising a steering input element and a sensor device, which includes at least one sensor, for registering the position of the steering input element, and comprising a servomechanism which includes a first actuator and acts on the steering input element, wherein the servomechanism is redundantly designed and comprises a second actuator. Due to the fact that the servomechanism comprises a second actuator, it can be ensured that a restoring force (steering counterforce), which counteracts the steering motion of a vehicle driver, or a restoring torque can always be generated at the steering input element, and therefore a vehicle driver always has a realistic road feel. It is therefore ruled out that no restoring force is generated in the event of failure of an actuator and that the vehicle driver loses his/her feel for the behavior of the vehicle, thereby resulting in a situation which is unsafe and undefined and, therefore, dangerous.

Different steering input elements are conceivable. For example, the steering input element can be provided as a steering wheel, a set of handlebars, a joystick, or the like.

The actuators of the servomechanism act in the same direction in order to induce a motion in the same direction at the steering input element. The actuators can be designed, for example, as hydraulic motors or electric motors. It is also conceivable to design the actuators as linear motors.

The sensor device can be redundantly designed and can comprise at least two, preferably three sensors for registering the position of the steering input element. For example, the sensors can be designed as angular displacement measuring devices, e.g., as potentiometers, and can register a steering input angle of a steering input element. Moreover, a selection device can be provided, which selects a sensor signal of two or three sensors in order to forward the sensor signal to a control unit. Preferably the sensor signal is selected that correctly renders the position of the steering input element with the highest probability. When the sensor device is redundantly designed, the safety of the steering module is further increased.

The steering module can comprise an interface for the signaling connection to a control unit. In particular, the steering module can be connected to a control unit via the interface and a cable. In this case, the control unit can be connected in a wired manner both to the servomechanism and to the sensor device. The signaling connection between the steering module and a control unit can also be designed to be wireless, however. In this case, the interface of the steering module can be designed as a transceiver in order to transmit and receive a radio signal, for example.

The reliability and fail-safe operation of the steering module can be further increased in that a protective device is provided for protecting the actuators against overload. In the simplest case, the protective device can be designed as a resistor in order to limit the current, with the aid of which an actuator is controlled.

At least one of the actuators can be designed as an electric motor, in particular a brushless electric motor. The advantage of a brushless electric motor is that the polarity reversal of the electric motor cannot be perceived at the steering input element, and therefore the actuator does not affect the road feel of a vehicle driver.

The actuators can be coupled to the steering input element via a transmission element, in particular a belt or a chain. For example, the two actuators and the steering input element can be arranged in the shape of a triangle, wherein a belt extends over the outputs of the actuators, or gear wheels connected thereto, and an axle connected to the steering input element, or a gear wheel disposed thereon.

In this context, it is advantageous when the position of one of the elements “first actuator”, “second actuator”, or “steering imput element” is displaceable relative to at least one other of the elements “first actuator”, “second actuator”, or “steering imput element” in order to be able to tension the transmission element. As a result, a reliable transmission of forces from the first and second actuators to the steering input element can be ensured in a manner free of slip and play, and without a response delay.

The steering module can comprise an airbag or can at least be configured for accommodating an airbag. For example, the airbag can be integrated into the steering input element.

The steering module can comprise a housing. The airbag can be disposed in the housing.

The scope of the invention also covers a steering system comprising a steering module according to the invention, wherein a control unit is provided, to which the steering module has a signaling connection. In this case, the steering module can be positioned at any position in or on a vehicle, for example in the area of a driver’s seat, in the area of a passenger seat, in the area of a backseat, in a central station, or in a vehicle cab. Moreover, it is conceivable to position the steering module outside the vehicle and to practically remote-control the vehicle. The particularity of the steering system according to the invention is that, independently of where the steering module is disposed, a vehicle driver always receives feedback on how the vehicle is behaving on the road and on which external influences act on the steering system. The actuators can be monitored by the control unit and/or a monitoring device. When an actuator fails, this can be signaled to the driver, and therefore the driver can safely bring the vehicle to a standstill with the aid of only one actuator.

The control unit can have a signaling connection to a steering adjuster and can be configured for generating a trigger signal for the steering adjuster with consideration for the position of the steering input element registered by the sensor device. The steering adjuster can be disposed at different points on a vehicle and can be of different designs. For example, the steering adjuster can be disposed on a steering column of a vehicle and can induce a rotary motion of the steering column. Moreover, it is conceivable that the steering adjuster is disposed on a steering gear. It is also conceivable that the steering adjuster is disposed directly at a steered wheel. When the steering system is utilized in a tracked vehicle, the steering adjuster can also be designed as a steering brake. In the case of a vehicle having articulated steering, the steering adjuster can effectuate the swiveling of the two vehicle parts relative to each other. The steering adjuster can be redundantly designed and, in particular, can comprise at least two actuators for inducing the steering motion. The fail-safe operation of the steering system is also increased as a result.

A sensor device can be provided for registering a variable describing the direction of travel of the vehicle and the control unit can be configured for generating a trigger signal for the servomechanism with consideration for the registered variable. The variable describing the direction of travel of the vehicle can be, for example, a wheel deflection angle, an angle of rotation in the case of vehicles having articulated steering, a steering angle, or a steering input angle of yet another steering input element (i.e., not of the steering input element of the steering module according to the invention). In other words, the registration of a variable describing the direction of travel of the vehicle can take place, for example, at a steering column. The steering column can be connected to yet another steering input element. On the basis of the variable that is registered, the servomechanism of the steering module can be controlled and the steering input element of the steering module can track the motion of the further steering input element. The steering motion of a vehicle driver at the further steering input element is therefore reproduced at the steering input element of the steering module. This embodiment provides advantages in a driving school, for example. A student driver can steer using the further steering input element. In a dangerous situation, the driving instructor can take over the steering of the vehicle via the steering input element of the steering module (after actuation of a switching element, if necessary), wherein the steering input element of the steering module always shows the correct position and has the correct position due to the tracking of the further steering input element, and therefore an immediate takeover is possible. Due to the fact that two actuators are provided in the steering module, the steering angle position specified by a vehicle driver is reliably transmitted to the steering input element.

The same advantages result in a vehicle which is utilized for autonomous driving. In a dangerous situation, in which, for example, the autonomous driving system does not respond correctly, a person can take over the steering of the vehicle via the steering input element of the steering module. In this case, the steering input element has, for example, a position corresponding to the wheel deflection, which has been adjusted on the basis of the variable describing the direction of travel. With the aid of the steering module, it is also possible to steer a vehicle from the passenger position, for example a municipal vehicle, in the case of which the side of the road must be viewed by the driver. In operation in normal road traffic, the vehicle can be steered from the driver’s seat using the conventional steering.

The control unit can be configured for generating a trigger signal for the servomechanism in order to effectuate a steering counterforce at the steering input element. The trigger signal for the servomechanism for effectuating a steering counterforce can be generated with consideration for a sensor signal. For example, the steering counterforce can be generated in the steering module with consideration for the sensor signal of the sensor device. Alternatively or additionally, it is conceivable to provide a sensor device at the wheels or at the steering gear and to generate the steering counterforce on the basis of this sensor signal. A current in a steering adjuster can also be registered as a sensor signal. The sensors for generating the sensor signal can be redundantly designed. In particular, the sensors can be triply redundantly designed.

Further advantages result when a switching element is provided, with the aid of which it is possible to switch from a passive mode, in which the steering input element of the steering module tracks a further steering input element, into an active mode, in which the steering input element is used for steering the vehicle. The switching element can be of different designs. For example, the switching element can be designed as an actuating ring, a knob, a touchscreen, a lever, or an acoustic or optical switching element.

A display device can be provided, which shows whether the steering system is in an active mode or a passive mode. For example, one or multiple LEDs can be provided for displaying the active mode and/or the passive mode.

The fail-safe operation of the steering system can be further increased when the control unit comprises at least two, preferably three redundantly designed CPUs. In particular, it can be provided that the servomechanism of the steering system and the sensor devices of the steering system are redundantly formed or designed. In this case, the mechanical servomechanisms can each comprise two actuators, while the sensor devices can each comprise three sensors. By way of this measure, the steering system is provided with the most fail-safe operation possible.

At least a few of the parameters utilized for generating the trigger signals output by the control unit to the servomechanism and/or the steering adjuster can be adjustable. It is therefore possible to adjust, for example, which input variables of the control unit are taken into consideration, with which weighting, in the generation of a trigger signal. In addition, an adjustment can be made regarding how directly or indirectly the servomechanism or the steering adjuster is to respond to a corresponding sensor signal as the input variable of the control unit. In particular, an adjustment can be made regarding the extent to which changes in torque —which arise in the case of changes in pavement, driving on black ice, a wheel pressing against the curb, etc. — are transmitted to the steering input element. In addition, a speed-dependent adjustment of the trigger signals can take place. Moreover, it is conceivable to carry out an adaptation to different users of the steering system.

The control unit can be configured for generating a trigger signal in order to transfer the steering input element into a neutral position if there is no steering input from a user.

Further features and advantages of the invention result from the detailed description of exemplary embodiments of the invention that follows, with reference to the figures in the drawing which shows the details that are essential to the present invention. Further features and advantages of the present invention also result from the claims. The features described therein are not intended to be interpreted literally, and are presented in such a manner that the particularities of the invention can be presented clearly. The various features can be achieved individually, or in numerous arbitrary variations in different variants of the invention.

BRIEF DESCRIPTION OF THE DRAWINGS

Exemplary embodiments of the invention are represented in the schematic drawing and are described in greater detail in the description that follows.

In the drawings.

DETAILED DESCRIPTION OF THE EMBODIMENTS

Figure 1:
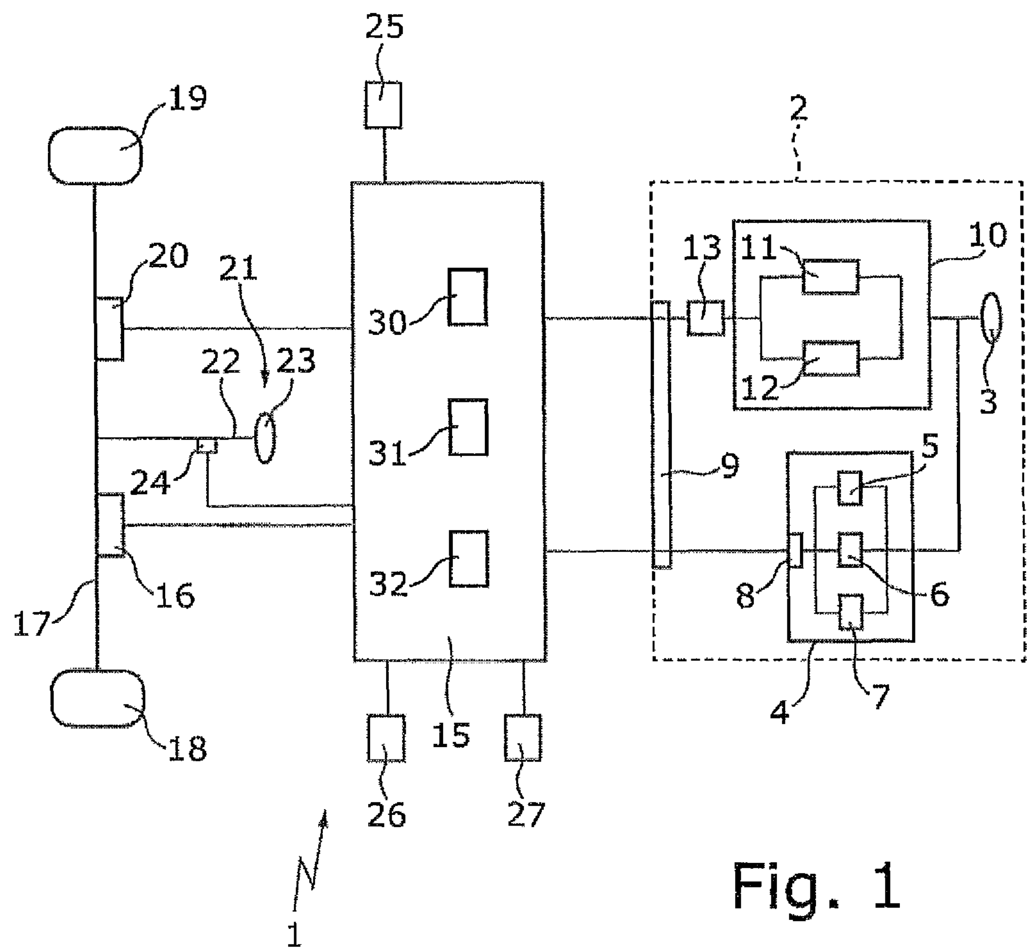
FIG. 1 shows a schematic representation of a steering system.

FIG. 1 shows a steering system 1 comprising a steering module 2. The steering module 2 can be disposed in or on a vehicle. In particular, the steering module can be retrofitted on a vehicle. It is also conceivable, however, to provide the steering module 2 outside the vehicle. In principle, the steering module can be disposed at any arbitrary point in a vehicle.

The steering module 2 comprises a steering input element 3 which is designed as a steering wheel in the exemplary embodiment shown. The steering input element 3 can be removable and, in particular, exchangeable. The motion induced by the steering input element 3, namely a rotary motion in the present case, can be registered by a sensor device 4. In particular, a steering input angle can be registered. The sensor device 4 can be redundantly designed and, for this purpose, can comprise at least two, preferably three sensors 5 to 7. By way of a selection device 8, it can be determined which sensor signal of the sensors 5 to 7 are output via an interface 9.

Moreover, the steering module 2 comprises a servomechanism 10, wherein the servomechanism 10 can also be redundantly designed. In particular, the servomechanism 10 can comprise a first actuator 11 and a second actuator 12. The first and second actuators 11, 12 can be designed as brushless electric motors, for example. The actuators 11, 12 are controlled by the same trigger signal, whereby the result is that the actuators generate a motion in the same direction. In particular, the actuators effectuate an introduction of force into the steering input element 3 in the same direction.

A protective device 13 can be provided in order to protect the actuators 11, 12 against overload. The protective device 13 can be designed as a resistor, in particular.

Via the interface 9, both the sensor device 4 and the servomechanism 10 have a signaling connection to a control unit 15 of the steering system 1. The connection can take place in a wired manner, for example by means of a cable, as represented here. A wireless signaling connection, for example a radio connection, is also conceivable, however.

A trigger signal for the servomechanism 10 can be generated by means of the control unit 15. In addition, a trigger signal for a steering adjuster 16 can be generated by means of the control unit 15. The steering adjuster 16 can have a signaling connection to the control unit 15. The steering adjuster 16 can be redundantly designed. In particular, the steering adjuster can comprise multiple actuators, preferably two or three actuators. In the exemplary embodiment shown, the steering adjuster 16 can drive a steering gear 17 and thereby adjust a wheel deflection angle of the wheels 18, 19. The steering input element 3 does not have a mechanical connection to the steering gear 17 and/or the wheels 18, 19.

Moreover, the control unit 15 can have a signaling connection to a sensor device 20. The sensor device 20 can also be redundantly designed. A variable describing the direction of travel of the vehicle can be registered by means of the sensor device 20. For example, a wheel deflection angle can be registered. The sensor device 20 can also be integrated into the steering adjuster 16. Moreover, it is conceivable to integrate a sensor device, in addition to the sensor device 20, into the steering adjuster 16. For example, a current drawn by the steering adjuster 16 can then be registered and, on the basis thereof, the direction of travel can be deduced.

It is also conceivable that yet another steering device 21 comprising a steering column 22 and yet another steering input element 23 is provided. By means of a sensor device 24 which can be disposed on the steering column 22, a steering input angle, for example, can be registered at the steering column 22 and transmitted to the control unit 15. The sensor device 24 can be redundantly designed.

Moreover, a sensor device 25, which can also be redundantly designed, can be provided. With the aid of the sensor device 25, forces acting on the vehicle, for example, can be registered. The sensor device 25 can be designed as a strain gauge, for example. For example, effects on the vehicle, which a user would feel at a steering input element when the steering input element is mechanically connected to the wheels of the vehicle, can be registered by means of the sensor device 25. In addition, the control unit 15 can be connected to a switching element 26.

In a first operating mode, in particular a passive mode, which can be displayed by means of a display device 27, a person can steer the vehicle via the further steering input element 23. The motion of the steering input element 23 or the steering column 22 can be registered via the sensor device 24. The steering input angle, which is registered in this way, is also a variable which describes the direction of travel of the vehicle. The control unit 15, which can comprise three redundantly provided CPUs 30 to 32, can be configured for generating, with consideration for the sensor signal of the sensor device 24, a trigger signal for the servomechanism 10, which effectuates a tracking of the steering input element 3. The steering input element 3 therefore carries out the same motion as the further steering input element 23.

It can also be provided that a trigger signal for the steering adjuster 16 can be generated by means of the control unit 15 on the basis of the sensor signal of the sensor device 24, and, as a result, the steering adjuster 16 effectuates a steering motion of the wheels 18, 19. This motion can be registered by means of the sensor device 20, for example. By means of the control unit 15, a setpoint/actual value comparison can be carried out and, if necessary, the trigger signal for the steering adjuster 16 can be corrected, in order to correctly implement the steering motion induced by means of the further steering element 23. Therefore, a regulation can take place.

By means of the switching element 26, it is possible to switch from the above-described passive mode into an active mode which can also be displayed by the display device 27. In the active mode, a steering motion can be induced by a user via the steering input element 3.

This motion can be registered by the sensor device 4 and an appropriate sensor signal can be output to the control unit 15. A trigger signal for the steering adjuster 16 can be generated with consideration for this sensor signal.

In order to provide a user with a road feel, the sensor signals of one or more of the sensor devices 20, 25 can be taken into consideration by the control unit 15 in the generation of a trigger signal for the servomechanism 10. The sensor signal generated by means of the sensor device 4 can be taken into consideration in order to ascertain the trigger signal for the servomechanism 10. The control unit 15 can be configured in such a way that the trigger signal for the servomechanism 10 is generated in such a way that a restoring force (steering counterforce) or a restoring torque is generated at the steering input element 3, which a user would also feel when he/she would feel a vehicle via a steering input element which is mechanically connected to a steering gear, such as the steering input element 23. In addition, the trigger signal for the servomechanism 10 can be generated in such a way that effects on the vehicle, for example when the vehicle is driven against a curb, can be felt by a user at the steering input element 3. The control unit 15 can therefore be configured for providing the user with haptic feedback at the steering input element 3.

It is understood that the steering module 2 can also be utilized in a vehicle which does not have a switching function or a further steering input element 23.

Figure 2:
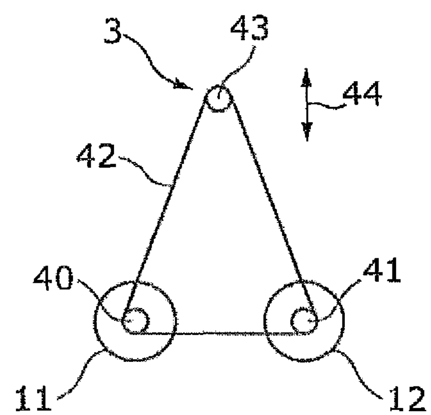
FIG. 2 shows a representation explaining the coupling of a servomechanism of a steering module to a steering input element.

FIG. 2 shows, in a highly diagrammatic manner, a top view from above onto the first and second actuators 11, 12 which are designed, in this case, as electric motors comprising an output 40, 41, respectively. The first and the second actuators 11, 12 are operatively connected to an axle 43 of the steering input element 3 via a transmission element 42 which is designed as a belt in the present case. The steering input element 3 is displaceable in the double-arrow direction 44 in order to tension the transmission element 42.

What is claimed is:

1. A steering module for a vehicle, comprising:

a steering input element;

a sensor device having at least one sensor configured for registering the position of the steering input element due to motion induced by the steering input element, and a servomechanism which includes a first actuator and acts on the steering input element, wherein the servomechanism is redundantly designed and comprises a second actuator, wherein the actuators are coupled to the steering input element via a transmission element, and wherein a position of one of the first actuator, second actuator or steering input element is displaceable relative to at least one other of the first actuator, second actuator or steering input element, in order to be able to tension the transmission element.

2. The steering module as claimed in claim 1, wherein the sensor device is redundantly designed and comprises at least two sensors for registering the position of the steering input element.

3. The steering module as claimed in claim 1, wherein the steering module comprises an interface for a signaling connection to a control unit.

4. The steering module as claimed in claim 1, further comprising a protective device configured for protecting the actuators against overload.

5. The steering module as claimed in claim 1, wherein at least one of the actuators is designed as an electric motor.

6. A steering system comprising a steering module as claimed in claim 1, wherein a control unit is provided, to which the steering module has a signaling connection.

7. The steering system as claimed in claim 6, wherein the control unit has a signaling connection to a steering adjuster and is configured for generating a trigger signal for the steering adjuster based on a position of the steering input element registered by the sensor device.

8. The steering system as claimed in claim 6, wherein a sensor device is provided for registering a variable describing a direction of travel of the vehicle and the control unit is configured for generating a trigger signal for the servomechanism based on the registered variable.

9. The steering system as claimed in claim 6, wherein the control unit is configured for generating a trigger signal for the servomechanism in order to effectuate a steering counterforce at the steering input element.

10. The steering system as claimed in claim 9, wherein the control unit is configured for generating the trigger signal for the servomechanism based on a sensor signal in order to effectuate a steering counterforce.

11. The steering system as claimed in claim 6, further comprising a switching element configured for switching the steering system from a passive mode, in which the steering input element of the steering module tracks a further steering input element, into an active mode, in which the steering input element is used for steering the vehicle.

12. The steering system as claimed in claim 6, wherein the control unit comprises at least two redundantly designed CPUs.

13. The steering system as claimed in claim 6, wherein the servomechanisms of the steering system and the sensor devices of the steering system are redundantly designed.

14. The steering system as claimed in claim 6, wherein at least a few of the parameters utilized for generating the trigger signals output by the control unit to the servomechanism and/or the steering adjuster are adjustable.

15. The steering system as claimed in claim 6, wherein the control unit is configured for generating a trigger signal for the servomechanism in order to transfer the steering input element into a neutral position if there is no steering input from a user.

16. The steering system as claimed in claim 11, wherein the further steering input is part of an additional steering module having a steering column and a sensor configured for sensing a steering input angle and transmitting the steering input angle to the control unit.

* * * * *